United States Patent
Army

(10) Patent No.: US 9,945,292 B2
(45) Date of Patent: Apr. 17, 2018

(54) THERMOELECTRIC COOLED TORQUE MOTOR

(71) Applicant: Hamilton Sundstrand Corporation, Windsor Locks, CT (US)

(72) Inventor: Donald E. Army, Enfield, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 341 days.

(21) Appl. No.: 14/643,836

(22) Filed: Mar. 10, 2015

(65) Prior Publication Data
US 2017/0058777 A1    Mar. 2, 2017

(51) Int. Cl.
| | | |
|---|---|---|
| F25B 21/04 | (2006.01) | |
| F16K 49/00 | (2006.01) | |
| F02C 7/18 | (2006.01) | |
| F25B 49/00 | (2006.01) | |
| F16K 31/04 | (2006.01) | |
| F25B 21/02 | (2006.01) | |

(52) U.S. Cl.
CPC .............. *F02C 7/185* (2013.01); *F16K 31/04* (2013.01); *F16K 49/00* (2013.01); *F16K 49/002* (2013.01); *F25B 21/02* (2013.01); *F25B 49/00* (2013.01); *F25B 21/04* (2013.01); *Y10T 137/6606* (2015.04)

(58) Field of Classification Search
CPC ......... H01L 23/38; B64D 15/02; B64D 15/04; B64D 2013/0603; B64D 2013/0607; B64D 2013/0618; F16K 49/00; F16K 49/002; F25B 21/02; F25B 21/04; F02C 7/12; F02C 7/185; Y10T 137/6606

USPC .......... 137/334, 338, 341; 219/520, 521, 490
See application file for complete search history.

(56) References Cited

U.S. PATENT DOCUMENTS

| | | | | |
|---|---|---|---|---|
| 3,216,660 A | | 11/1965 | Mott | |
| 4,421,067 A | | 12/1983 | Krowech | |
| 4,831,819 A | * | 5/1989 | Norris | ............... F02C 7/047 244/134 R |
| 5,440,887 A | * | 8/1995 | Nishizato | ............... B01F 3/022 137/341 |
| 5,965,046 A | * | 10/1999 | Franklin | ............... F04B 37/08 137/341 |
| 6,060,691 A | * | 5/2000 | Minami | ............... F16K 49/002 137/341 |

(Continued)

FOREIGN PATENT DOCUMENTS

| | | | | |
|---|---|---|---|---|
| DE | 102005042784 A1 | * | 2/2007 | ............ F16K 49/00 |
| DE | 102007007680 B3 | * | 6/2008 | ........... F16K 5/0647 |
| EP | 2 482 161 A2 | | 8/2012 | |

OTHER PUBLICATIONS

Extended European Search Report for EP Application No. 16159582.2, dated Jul. 20, 2016, 7 pages.

*Primary Examiner* — Mary McManmon
*Assistant Examiner* — Jonathan Waddy
(74) *Attorney, Agent, or Firm* — Kinney & Lange, P.A.

(57) ABSTRACT

A valve system includes a valve, a valve controller, a thermoelectric cooler, and a controller. The valve is configured to open and close a control device in response to a working fluid. The valve controller controls the flow of the working fluid through the valve. The thermoelectric cooler surrounds the valve controller transfers heat between the valve controller and an ambient environment. The controller directs a current to drive the thermoelectric cooler.

14 Claims, 3 Drawing Sheets

(56) References Cited

U.S. PATENT DOCUMENTS

| | | | | |
|---|---|---|---|---|
| 6,333,586 | B1* | 12/2001 | Polach | F02M 47/027 |
| | | | | 310/328 |
| 6,989,512 | B2* | 1/2006 | Lin | F27B 17/02 |
| | | | | 219/201 |
| 7,015,424 | B2* | 3/2006 | Lin | H05B 3/10 |
| | | | | 219/201 |
| 8,959,927 | B2* | 2/2015 | Kamp | G05D 16/2093 |
| | | | | 137/489 |
| 9,360,514 | B2* | 6/2016 | Phan | G01R 31/003 |
| 2003/0192595 | A1* | 10/2003 | Benson | G01F 1/363 |
| | | | | 137/488 |
| 2006/0225788 | A1* | 10/2006 | Hiratsuka | F16K 49/00 |
| | | | | 137/341 |
| 2007/0098992 | A1* | 5/2007 | Hasegawa | H01C 17/00 |
| | | | | 428/408 |
| 2007/0289636 | A1* | 12/2007 | Chitwood | F16L 59/161 |
| | | | | 137/375 |
| 2012/0211204 | A1* | 8/2012 | Agonafer | H01L 23/473 |
| | | | | 165/104.31 |

* cited by examiner

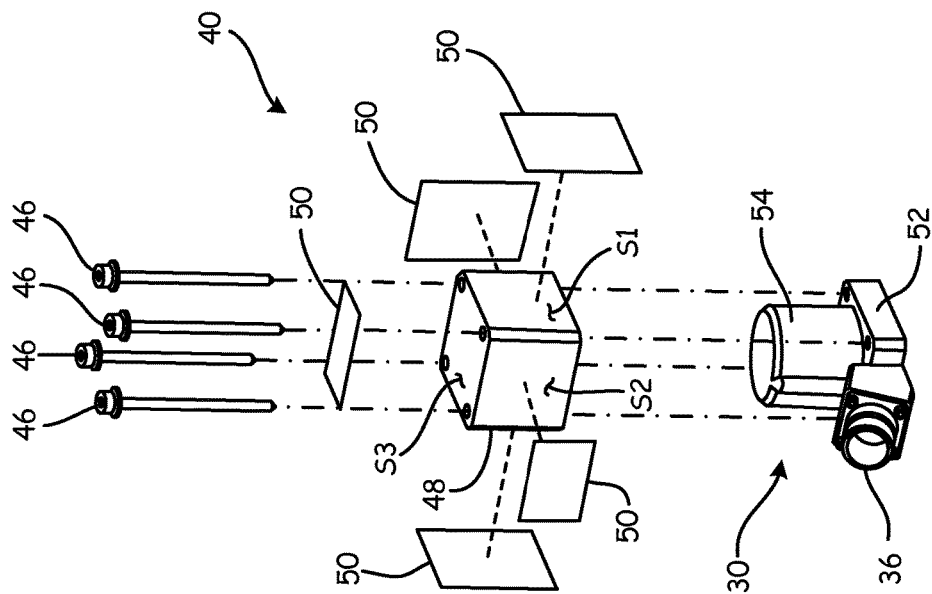
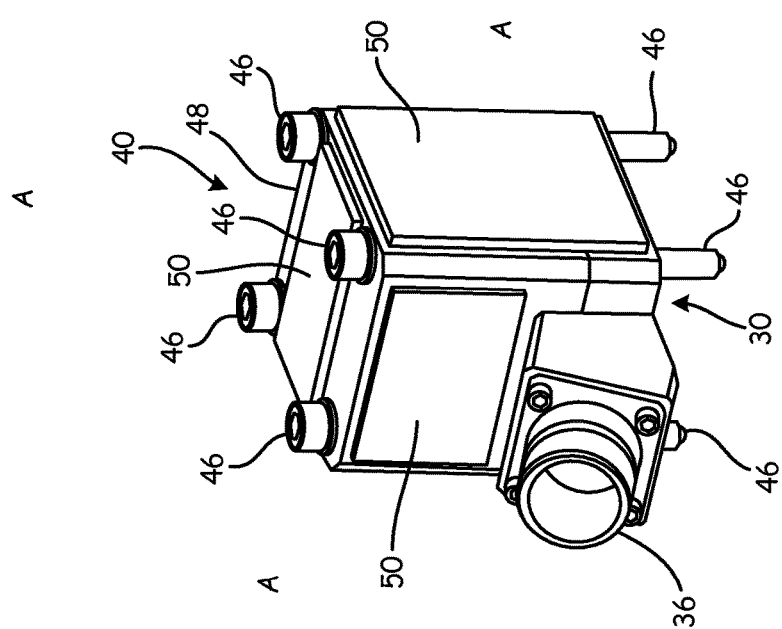
Fig. 2B
Fig. 2A

THERMOELECTRIC COOLED TORQUE MOTOR

BACKGROUND

Pneumatic valves are one of many components of a system that controls the flow of a fluid through a system. Pneumatic valves are control devices powered by pressurized fluid, normally air. In many circumstances, pneumatic pressure is supplied to the driving, or actuating, portion of the valve from a pressure source. The driving portion of the valve transforms pneumatic pressure into mechanical power for operating or actuating a control mechanism in a supply line, duct, or pipe. The control mechanism may be an isolation valve having only two positions, open and closed, where the open position allows flow to pass and the closed position stops flow. The control mechanism may also be a control valve that is capable of modulating flow of the fluid it is controlling. For example, the control valve may allow fluid to pass in increments of one percent from zero percent to one hundred percent.

To control the supply of fluid into the driving portion of a pneumatic valve, a controlling device is often used. The controlling device regulates flow of the fluid into the driving portion of the pneumatic actuator using nozzles or control orifices that are regulated. One example of a controlling device is a torque motor, which uses an electromagnetic motor to control the opening and closing of nozzles to selectively provide air to the driving portion of a pneumatic actuator.

SUMMARY

In one embodiment, a valve system includes a valve, a valve controller, a thermoelectric cooler, and a controller. The valve is configured to open and close a control device in response to a working fluid. The valve controller controls the flow of the working fluid through the valve. The thermoelectric cooler surrounds the valve controller transfers heat between the valve controller and an ambient environment. The controller directs a current to drive the thermoelectric cooler.

In another embodiment, a method includes-controlling operation of a valve with a valve controller. A temperature signal is received that is a function of a temperature of the valve controller. A control signal is created as a function of the temperature signal and a desired valve controller temperature. A thermoelectric cooler that surrounds the valve controller is operated based on the control signal to transfer heat between the valve controller and an ambient environment.

BRIEF DESCRIPTION OF THE DRAWINGS

FIG. 2A is an isometric view of the valve controller and thermoelectric cooler of the valve assembly of FIG. 1.

FIG. 2B is an exploded isometric view of the valve controller and thermoelectric cooler of FIG. 2A.

DETAILED DESCRIPTION

Figure 1:
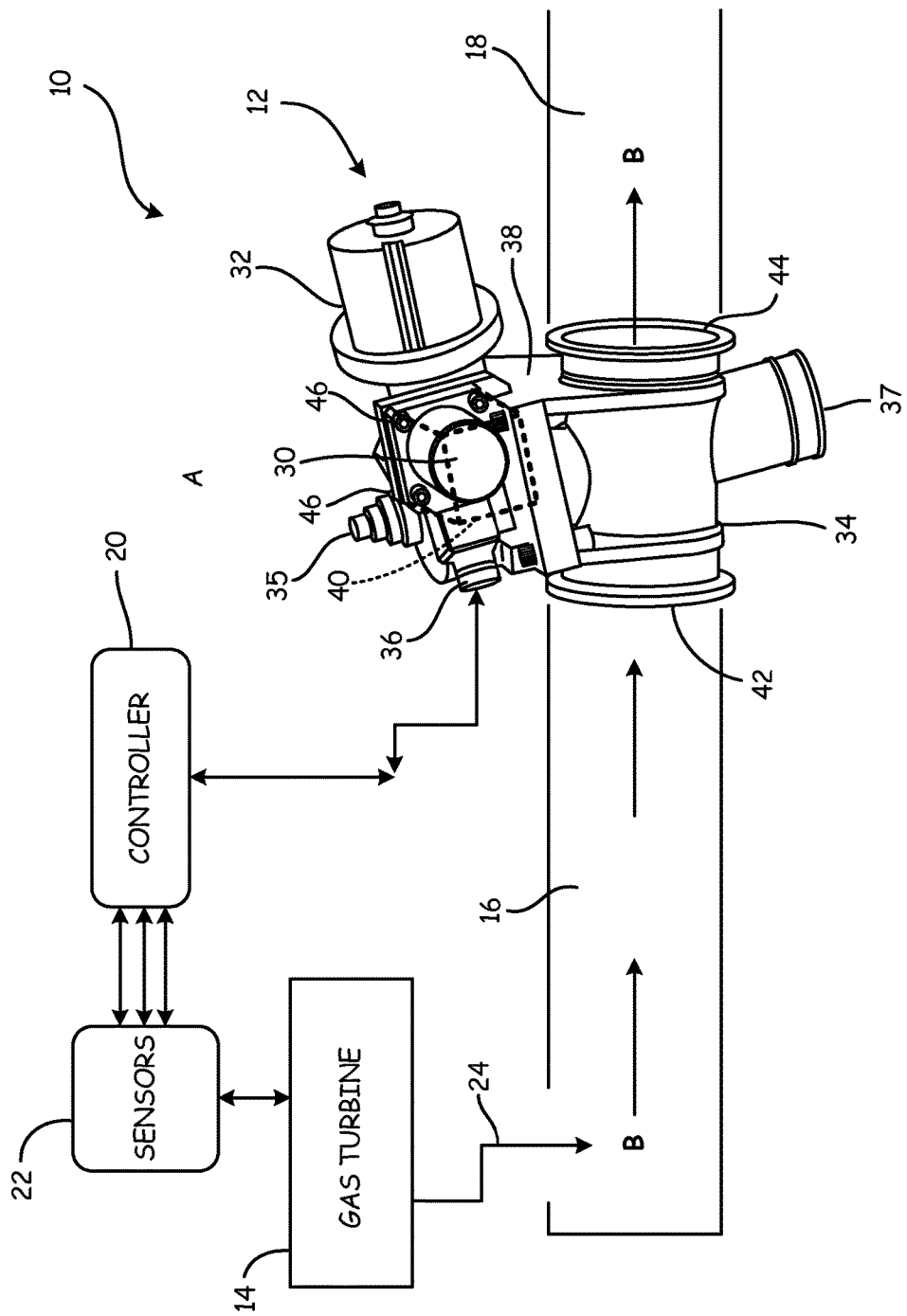
FIG. 1 is a schematic view of an environmental control system.

FIG. 1 is a schematic view of environmental control system 10, which includes valve system 12, gas turbine engine 14, upstream duct 16, downstream duct 18, controller 20, sensors 22, and bleed path 24. Valve system 12 includes valve controller 30, valve actuator 32, control device 34, control device shaft 35, controller conduit inlet 36, shaft bearing housing 37, valve body 38, thermoelectric cooler 40, bleed inlet 42, and bleed outlet 44. Also illustrated in FIG. 1 are ambient environment A and bleed stream B.

Gas turbine engine 14 connects to upstream duct 16 through bleed path 24, which may include ducts, pipes, or other conduits (not shown). Upstream duct 16 connects to valve system 12 at bleed inlet 42. Also connected to valve system 12 at bleed outlet 44 is downstream duct 18. Upstream duct 16 and downstream duct 18 can be ducts, pipes, tubes, ports or any other passageways capable of supporting pressurized flow. These passageways can be made of metal, plastic, or any other material suited for allowing the flow of pressurized fluid.

Valve body 38 is a metal body for the mounting and supporting the components of valve system 12. Valve body 38 can be made of steel, a steel alloy, or other material suitable for high temperature applications. Thermoelectric cooler 40 mounts to valve controller 30, which mounts to valve body 38 through bolts 46. Bolts 46 firmly secure valve controller 30 to valve body 38. Also connected to valve body 38 is actuator 32 through bolts or other fasteners. Thermoelectric cooler 40 surrounds valve controller 30 and is surrounded by ambient environment A. Also connected to valve body 38 is control device 34, which includes bleed inlet 42 and bleed outlet 44.

Actuator 32 is a pneumatically driven piston actuator, which connects by linkage to control device 34. Actuator 32 is also in fluid communication with control device 34 and valve controller 30 through porting that is routed through valve body 38. The porting may be tubes or pipes, or may be channels cast into or machined out of valve body 38. Control device 34 houses a disc similar to that found in a butterfly valve, but can also be a ball, gate, or any other flow modulating device. Valve system 12 is, for example a servo valve system of an aircraft control system.

Controller 20 is electrically connected to valve controller 30 through conduit, which connects to valve assembly 12 at conduit inlet 36. Also electrically connected to controller 20 are sensors 22, which are also connected through conduit. Sensors 22 can be measurement devices within gas turbine engine 14. The conduit can be wiring or any other conduit for carrying a control signal or electrical power.

According to one embodiment, gas turbine engine 14 provides bleed stream B via bleed path 24 from a compressor within gas turbine engine 14. Bleed stream B is routed from gas turbine engine 14 and into upstream duct 16 where it travels through upstream duct 16 and encounters two possible flow paths. In the first path, bleed stream B can travel to control device 34, of valve system 12, where bleed stream B can be regulated. For example, control device 34 can be in an open position allowing bleed stream B to flow past a disc (not shown) and on to downstream duct 18, where bleed stream B can continue to the remainder of aircraft environmental control system 10. Thereafter, processes can be performed on or by bleed stream B, such as heating or cooling. If control device 34 is in a closed position, bleed stream B can be stopped, preventing bleed stream B from flowing into downstream duct 18.

Bleed stream B also travels from upstream duct 16 into actuator 32 porting within valve body 38. While in actuator 32, bleed stream B can be used by actuator 32 for pneumatic pressure and can also be routed to valve controller 30, where the flow of bleed stream B is controlled for the purpose of operating valve system 12.

After entering valve controller 30, bleed stream B can be returned to piston actuator 32 to pneumatically power a piston (not shown) within actuator 32. Actuator 32 transforms the pneumatic pressure of bleed stream B into linear motion. The linear motion of piston is transformed into rotational motion by control device shaft 35. Control device shaft 35 then transfers the rotational motion to control device 34. Below control device 34 is shaft bearing housing 37 which supports control device shaft 35 and reduces frictional forces applied to control device shaft 35 due to its rotation. Within control device 34 is a disc (not shown) which is rotated by control device shaft 35. The rotation of the disc within control device 34 functions to open the passageway within control device 34 for bleed stream B to flow from upstream duct 16 to downstream duct 18, or to close this passageway. Control device 34 is described as a butterfly type valve; however, other modulating valves, such as ball or globe valves may be used.

Valve controller 30 receives control signals from controller 20 through conduit. These signals instruct valve controller 30 how to control the flow of bleed stream B through valve controller 30, which in turn actuates actuator 32, as described above. Controller 20 makes determinations on how to control valve controller 30 based on calculations performed within controller 20. These calculations are performed based on inputs received through sensors 22. Sensors 22 can be measurement devices within gas turbine engine 14, aircraft environmental control system 10, another controller within these systems, or any other signal source within an aircraft. The measurement devices with these systems provide measurement data, such as pressure, temperature, or flow rate, to be considered by controller 20.

In one embodiment, thermoelectric cooler 40 rejects heat from valve controller 30 to ambient environment A to cool valve controller 30. Thermoelectric cooler 40 is a thermoelectric device operating under the principles of the Peltier effect. Controller 20 can send or direct a current to a circuit within thermoelectric cooler 40. This causes heat to transfer from one conducting surface through semiconductors within thermoelectric cooler 40 to the other conducting surface of thermoelectric cooler 40. This results in the lowering of the temperature of one of the surfaces and raising the temperature of the other surface of thermoelectric cooler 40. This process is reversible, so that heat can be transferred in either direction between the cooling surfaces, depending on the direction of the current flow through the circuit.

Valve controller 30 can be an electromagnetic-pneumatic device, such as a torque motor, using electricity to operate nozzles within valve controller 30 to control the flow of bleed stream B, pressurized air, into and out of valve controller 30. In operation, valve controller 30 can receive a constant or frequent flow of bleed stream B, which can have a temperature of up to (or over) 1000 degrees Fahrenheit (538 C). This hot air heats up valve controller 30 and its internal components and wiring. For example, valve controller 30 can reach temperatures over 500° Fahrenheit (260 C). Some components within valve controller 30, such as the electrical components, are susceptible to failure at these temperatures, or due to thermal cycling between these operating temperatures and much lower non-operating temperatures.

A solution in the prior art is to apply expensive coatings to prevent component failure due to high operational temperatures and thermal cycling. Another solution common in the prior art is mounting of valve controllers remotely from the actuator to avoid thermal conduction from the actuator to the valve controller, and to provide the valve controller with a lower ambient temperature environment to keep the valve controller cool. Remote mounting of the valve controller is a common solution for dealing with heat in the prior art, but comes at the expense of routing lines from the actuator to the valve controller. Routing lines add cost and weight, and create lag in operation of the valve system caused by delays in the valve controller sending and receiving fluid over a distance. These problems can be exacerbated by leaks that develop in the lines.

This disclosure addresses these issues by adding thermoelectric cooler 40 to valve controller 30. Thermoelectric cooler 40 cools valve controller 30 by transferring heat from valve controller 30 to ambient environment A. This heat transfer process can lower the temperature of valve controller 30 considerably using ambient environment A, which can have a temperature range of 200-400 degrees Fahrenheit (93-204 C). These functions decrease the operating temperature of valve controller 30 and provide several benefits. First, valve controller 30 can be directly mounted to actuator 24, saving space and cost. Second, component life of valve controller 30 is increased, saving parts and labor costs. Third, cost reductions of valve controller 30 (such as removal of thermal protections) can be implemented. Fourth, control latency is improved by eliminating lines having relatively long lengths. Fifth, the addition of thermoelectric cooler 40 to valve controller 30 only requires additional wiring (as opposed to other cooling means which require air or liquid), which can be run with the harness for valve controller 30, to be operational.

FIG. 2A is an isometric view of valve controller 30 and thermoelectric cooler 40. FIG. 2B is an exploded isometric view of valve controller 30 and thermoelectric cooler 40. FIGS. 2A and 2B are discussed concurrently.

Thermoelectric cooler 40 includes housing 48 and thermoelectric tiles 50. Valve controller 30 includes base 52 and motor 54. Also shown are bolts 46, surfaces S1, S2, and S3, and ambient environment A.

Housing 48 connects to base 52 of valve controller 30, substantially surrounding motor 54 of valve controller 30. Housing 48 is secured to base 52 by bolts 46, which pass through housing 48 and through base 52, and can be secured to valve body 38 (of FIG. 1). Bolts secure housing 48 to valve controller 30 and securing valve controller 30 to valve body 38.

As housing 48 is a parallelepiped and motor 54 is predominantly cylindrical, there will be little contact area between their surfaces. Therefore, a thermal grease or thermal compound can be used to fill the void between housing 48 and motor 54 to increase the heat transfer efficiency between housing 48 and motor 54. Electrically insulating thermal grease can also be used to protect from undesired electrical conduction.

Thermoelectric tiles 50 mount to the external surfaces of housing 48. Though five of thermoelectric tiles 50 are shown, more or less can be used. Thermoelectric tiles 50 are cuboids having one dimension significantly smaller than their other two dimensions. However, thermoelectric tiles 50 can be any other shape that is configurable to be a thermoelectric device. Thermoelectric tiles 50 are attached to housing 48 so that one of the large surfaces of each thermoelectric tiles 50 is in physical contact with housing 48. Thermoelectric tiles 50 can also be in contact with base 52 or any surface of valve controller assembly 19. To ensure thermal contact between surfaces, Thermoelectric tiles 50 can have a thermal compound or thermal grease applied between thermoelectric tiles 50 and their contact surface of housing 48 or base 52, such as a polysynthetic silver thermal compound. Thermoelectric tiles 50 can be secured to housing 48 by an adhesive, fasteners, or any other means allowing for contact between housing 48 and substantially the entire contact surface of thermoelectric tiles 50 while allowing for good heat transfer between housing 48 and thermoelectric tiles 50.

Thermoelectric tiles 50 can be different sizes. For example, thermoelectric tile 50 which mounts to surface S3 is significantly smaller than thermoelectric tile 50 that mounts to surface S1. This allows for thermoelectric tile 50 mounted to surface S3 to fit between bolts 46. Because thermoelectric tile 50 mounted to surface S1 has no mounting protrusions it can cover all of surface S1 and more (some of base 52 near surface S1). In another embodiment, thermoelectric tiles 50 can form a single piece to completely cover all but the mounting surfaces of housing 48.

Similar to the operation described in FIG. 1, thermoelectric tiles 50 transfer heat from housing 48 to ambient environment A. Ambient environment A can be a compartment within an aircraft nacelle, or any other compartment of an aircraft where valve system 12 can be used. Specifically, heat is transferred from valve controller 30 to housing 48. From housing 48 heat is transferred to thermoelectric cooler 40, which rejects heat to ambient environment A.

One benefit of this embodiment is derived from the use of thermoelectric tiles 50. Because multiple tiles are used, the external surface of housing 48 can be covered with thermoelectric tiles as densely as is physically or practically possible. This can increase the thermal or heat transfer efficiency and can also increase the total heat that can be rejected by thermoelectric cooler 40. When more heat is rejected by thermoelectric cooler 40 valve controller 30 will operate at a lower temperature, further increasing component life of valve controller 30 and decreasing costs.

In another embodiment, thermoelectric cooler 40 can transfer heat from ambient environment A to valve controller 30. By directing current to flow in the opposite direction through the circuit within thermoelectric cooler 40, heat can flow from ambient environment A to thermoelectric tiles 50 to housing 48 to valve controller 30. This can be done when an aircraft is not operational and is stored in an environment having a temperature below freezing conditions. These conditions can cause moisture within the small pneumatic control lines of valve controller 30 to freeze, disturbing normal operation of valve controller 30. By transferring heat from ambient environment A to valve controller 30 the moisture within the lines can be heated above freezing temperatures allowing for faster system startup completion. This process also prevents damage from occurring to components within valve controller 30. One benefit of this embodiment is that it can eliminate the need for an additional heater to heat the valve controller 30 during startup.

Figure 3:
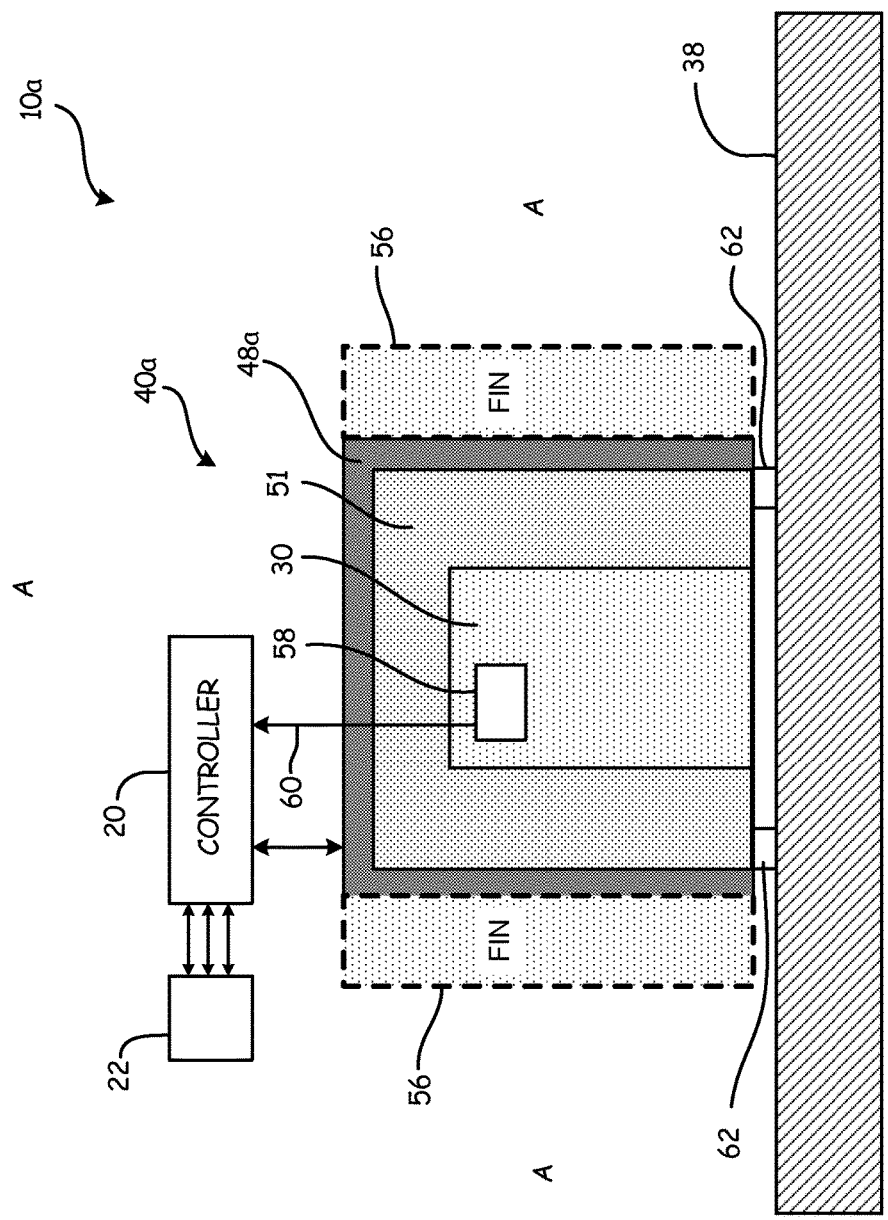
FIG. 3 is a schematic view of a portion of another embodiment of an environmental control system.

FIG. 3 is a schematic view of environmental control system 10a, which includes controller 20, sensors 22, valve controller 30, valve body 38, and thermoelectric cooler 40a. Thermoelectric cooler 40a includes housing 48a, thermoelectric device 51, fins 56, temperature sensor 58, temperature sensor input 60, and mounts 62. Also shown in FIG. 3 is ambient environment A.

Valve controller 30 is mounted to valve body 38 consistent with FIGS. 1 and 2. However, mounting bolts can pass through thermoelectric cooler 40a or housing 48a. Also, mounts 62 are a thermal insulator which physically separate valve controller 30 and thermoelectric cooler 40a from valve body 38.

Valve controller 30 is mounted to and surrounded by thermoelectric device 51. Thermoelectric device 51 can have a substantially cylindrical inner profile to match the external profile of valve controller 30, or the two profiles can be any other shape allowing for thermoelectric device to enclose and contact substantially all of valve controller 30. To further increase the contact area and efficiency of thermal transfer, a thermal paste can be used between valve controller 30 and thermoelectric device 51.

Housing 48a is mounted to and surrounds thermoelectric device 51. Housing 48a can have a substantially cylindrical inner profile to match the external profile of thermoelectric device 51, or the two profiles can be any other shape allowing for housing 48a to enclose and contact substantially all of thermoelectric device 51. To further increase the contact area and efficiency of thermal transfer, a thermal paste can be used between housing 48 and thermoelectric device 51. Thermoelectric device 51 is shown as a single piece, but can also be multiple pieces or multiple thermoelectric devices, as shown in FIGS. 2A and 2B. Alternatively, housing 48a can be integral to thermoelectric cooler 40a. For example, housing 48a can be one of the conductive surfaces of thermoelectric device 51. Then, a non-electrically conductive coating can be applied to housing 48a to prevent undesired electrical conduction.

Fins 56 are attached to housing 48a. Fins 56 have a thickness dimension that is small relative to their height and width dimensions. Fins 56 can be made of aluminum, steel, copper, or other thermally conductive materials. Fins 56 can be placed to surround housing 48a entirely, or can cover a portion of the surface of housing 48a. Also, fins 56 are shown as being located on two sides of housing 48a; however, fins 56 can attach to housing 48a anywhere fins 56 can be physically placed and where it is desired to reject heat.

Temperature sensor 58 is mounted within valve controller 30. Temperature sensor 58 can be mounted anywhere within valve controller 30. For example, temperature sensor 58 can be mounted on wire or windings of valve controller 30, or can be mounted on the internal side of the casing of valve controller 30. Temperature sensor 58 is electrically connected to controller 20 through temperature sensor input 60. Temperature sensor 58 can be any sensor capable of sending a temperature signal based on a detected temperature. For example, temperature sensor 58 can be a thermocouple, thermistor, or resistance temperature detector (RTD).

Thermoelectric cooler 40a is electrically connected to controller 20 through conduit, which can be a wire or other electrical conduit. Controller 20 can also be, or can provide connection to, a power source for thermoelectric cooler 40a. Also electrically connected to controller 20 are sensors 22. Sensors 22 can be connected to measurement devices within gas turbine engine 14, as shown in FIG. 1. Sensors 22 can be connected to measurement devices as described above, for providing measurement data, such as pressure, temperature, or flow rate, to be considered by controller 20.

In one embodiment, valve controller 30 receives control signals from controller 20 through conduit. These signals instruct valve controller 30 on how to control the flow of bleed stream B as described above. During operation, thermoelectric cooler 40a rejects heat from valve controller 30 to ambient environment A to cool valve controller 30. Applying a current directed to thermoelectric device 51, directed by controller 20, results in heat transferring from valve controller 30 to the inner conducting surface of thermoelectric device 51, to its outer conducting surface, to housing 48a and fins 56 for heat to be rejected to ambient environment A. This process cools valve controller 30. In this embodiment, fins 56 increase heat exchange efficiency of thermoelectric cooler 40a in this process. This has several benefits. First, it increases the thermal efficiency of thermoelectric cooler 40a, which saves energy and cost. Second, fins can increase the amount of heat that can be rejected be thermoelectric cooler 40a, which may lower the operating temperature of valve controller 30, increasing components life and saving cost.

Further, mounts 62 act as a thermal insulator, reducing the amount of heat that valve controller 30 conducts from valve body 38. Mounts 62 can be a thermal insulator such as a plastic, fiber base, or ceramic base. This reduces the heat transferred into valve body 38 and thus valve controller 30. Mounts 62 can have a small surface area for minimizing contact between valve body 38 and valve controller 30. Mounts 62 also have minimum contact area with valve body 38, further reducing the heat transfer between valve controller 30 and actuator 24. This provides several benefits. First, valve controller 30 can be directly mounted to actuator 24, saving space and cost. Second, component life of valve controller 30 is increased, saving parts and labor costs. Third, cost reductions of valve controller 30 (such as removal of thermal protections) can be implemented. Fourth, control latency is improved by eliminating lines having relatively long lengths.

Temperature sensor 58 creates a temperature signal as a function of the temperature of valve controller 30. This signal can be sent to controller 20, where controller 20 can create a drive signal to control thermoelectric cooler 40a as a function of the temperature signal. This allows controller 20 to maintain, or control to, a desired temperature within valve controller 30. Being able to control to a desired temperature helps to ensure that all of the above-listed benefits are met, because the desired control temperatures will actually be met, whereas in a system without this control scheme, it can only be assumed that the control temperatures will be met. Further, this system allows for adjustments to the control set-points, such as desired temperature within valve controller 30, to further optimize for efficiency and component longevity, saving energy and cost.

Also, thermoelectric device can transfer heat from ambient environment A to valve controller 30 as described in embodiments above. Therefore, controller 20 can use temperature sensor 58 to determine when to reverse the direction of current through thermoelectric cooler 40a to allow for thermoelectric cooler 40a to transfer heat from ambient environment A into valve controller 30.

Discussion of Possible Embodiments

The following are non-exclusive descriptions of possible embodiments of the present invention.

A valve system includes a valve, a valve controller, a thermoelectric cooler, and a controller. The valve is configured to open and close a control device in response to a working fluid. The valve controller controls the flow of the working fluid through the valve. The thermoelectric cooler surrounds the valve controller transfers heat between the valve controller and an ambient environment. The controller directs a current to drive the thermoelectric cooler.

The system of the preceding paragraph can optionally include, additionally and/or alternatively, any one or more of the following features, configurations and/or additional components.

A valve controller housing can surround the valve controller, and the thermoelectric cooler can mount to the valve controller housing and reject heat from the housing to the ambient environment.

The thermoelectric cooler can be comprised of a plurality of thermoelectric tiles that can be mounted to the valve controller housing.

The thermoelectric cooler can include five thermoelectric tiles.

There can be a void between the valve controller and the valve controller housing, and the void can be filled with thermally conductive grease.

Fins can extend from a surface of the thermoelectric cooler to the ambient environment.

The controller can control the operation of the thermoelectric cooler and the valve controller.

A temperature sensor can be mounted in the valve controller for sending a temperature signal to the controller as a function of an operating temperature of the valve controller.

The controller can perform a calculation to determine a calculated operating temperature of the valve controller as a function of the temperature signal, and wherein the controller can adjust an amount of heat rejected by the thermoelectric cooler to maintain a desired calculated operating temperature of the valve controller.

The controller can include an operating mode in which the controller directs flow of the current driving the thermoelectric cooler to cause heat to be transferred into the servo valve from the ambient environment.

The valve controller can be mounted to the valve and separated from the valve by a thermal insulator.

The valve system can be part of a gas turbine engine system. The valve can be a servo valve, the valve controller can be a torque motor for controlling the servo valve, and the servo valve can be responsive to a working fluid of a gas turbine engine.

The working fluid can be bleed air from the gas turbine engine.

A method includes-controlling operation of a valve with a valve controller. A temperature signal is received that is a function of a temperature of the valve controller. A control signal is created as a function of the temperature signal and a desired valve controller temperature. A thermoelectric cooler that surrounds the valve controller is operated based on the control signal to transfer heat between the valve controller and an ambient environment.

The system of the preceding paragraph can optionally include, additionally and/or alternatively, any one or more of the following features, configurations and/or additional components or steps.

Heat can be transferred from the valve controller to a valve controller housing.

Heat can be transferred from the valve controller housing to the thermoelectric device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
controlling operation of a valve with a valve controller, wherein the valve controller is a torque motor;
applying heat to the valve controller in a first mode of operation, wherein heat is supplied by a working fluid entering the valve controller;
receiving a temperature signal that is a function of a temperature of the valve controller;
creating a control signal as a function of the temperature signal and a desired valve controller temperature;
operating a thermoelectric device that surrounds the valve controller based on the control signal to transfer heat between the valve controller and an ambient environment, wherein a valve controller housing surrounds the valve controller and wherein the thermoelectric device comprises a plurality of thermoelectric tiles mounted to the valve controller housing and rejects heat from the housing to the ambient environment; and
filling a void between the valve controller and the valve controller housing with a thermally conductive grease.

2. The method of claim 1, and further comprising:
transferring heat from the valve controller to the valve controller housing; and
transferring heat from the valve controller housing to the thermoelectric device.

3. The method of claim 1, and further comprising:
transferring heat from the valve controller to the ambient environment in the first mode of operation; and
transferring heat to the valve controller from the ambient environment in a second mode of operation.

4. The method of claim 1, wherein a temperature of the working fluid supplied to the valve controller reaches or exceeds 538 degrees Celsius (1000 degrees Fahrenheit).

5. A valve system for a gas turbine engine, the valve system comprising:
a control device comprising:
a working fluid inlet; and
a working fluid outlet;
a valve element positioned in the control device and configured to open and close the control device in response to a working fluid;
a valve controller mounted to the control device and configured to receive a portion of the working fluid and to control the flow of the working fluid through the control device, wherein the valve controller is a torque motor;
a thermoelectric device comprising a plurality of thermoelectric tiles and surrounding the valve controller for transferring heat between the valve controller and an ambient environment;
a valve controller housing surrounding the valve controller, wherein the plurality of thermoelectric tiles of the thermoelectric device are mounted to the valve controller housing and reject heat from the housing to the ambient environment and wherein a void between the valve controller and the valve controller housing is filled with thermally conductive grease;
a system controller for directing a current to drive the thermoelectric device; and
a temperature sensor mounted in the valve controller for sending a temperature signal to the system controller as a function of an operating temperature of the valve controller;
wherein the system controller directs current to the thermoelectric device to transfer heat away from the valve controller in a first mode of operation and to transfer heat to the valve controller in a second mode of operation, wherein the mode of operation is determined by the system controller based on the temperature signal.

6. The valve system of claim 5, wherein the thermoelectric device includes five thermoelectric tiles.

7. The valve system of claim 5 and further comprising fins extending from a surface of the thermoelectric device to the ambient environment.

8. The valve system of claim 5, wherein the system controller controls the operation of the thermoelectric device and the valve controller.

9. The valve system of claim 8, wherein in the second mode of operation, the system controller directs flow of the current driving the thermoelectric device to cause heat to be transferred into the valve controller from the ambient environment.

10. The valve system of claim 5, wherein the system controller performs a calculation to determine a calculated operating temperature of the valve controller as a function of the temperature signal, and wherein the system controller adjusts an amount of heat rejected by the thermoelectric device to maintain a desired calculated operating temperature of the valve controller.

11. The valve system of claim 5, wherein the valve controller is separated from the control device by a thermal insulator.

12. A gas turbine engine system including the valve system of claim 1, wherein the valve system is a servo valve responsive to a working fluid of a gas turbine engine.

13. The gas turbine engine system of claim 12, wherein the working fluid is bleed air from the gas turbine engine.

14. The valve system of claim 5, wherein the valve system is configured for operation in an environment wherein a temperature of the working fluid reaches or exceeds 538 degrees Celsius (1000 degrees Fahrenheit).

* * * * *